US012078430B2

(12) United States Patent
Menner et al.

(10) Patent No.: US 12,078,430 B2
(45) Date of Patent: Sep. 3, 2024

(54) CONNECTOR SUITABLE TO BE CONNECTED TO A MULTI-PORT EXTRUDED TUBE

(71) Applicant: A. RAYMOND ET CIE, Grenoble (FR)

(72) Inventors: Nico Menner, Heitersheim (DE); Michael Trede, Habsheim (FR); Ralf Herbers, Lörrach (DE); Julien Rat, Apprieu (FR)

(73) Assignee: A. RAYMOND ET CIE, Grenoble (FR)

( * ) Notice: Subject to any disclaimer, the term of this patent is extended or adjusted under 35 U.S.C. 154(b) by 56 days.

(21) Appl. No.: 17/911,778

(22) PCT Filed: Mar. 8, 2021

(86) PCT No.: PCT/EP2021/055798
§ 371 (c)(1),
(2) Date: Sep. 15, 2022

(87) PCT Pub. No.: WO2021/190913
PCT Pub. Date: Sep. 30, 2021

(65) Prior Publication Data
US 2023/0137448 A1    May 4, 2023

(30) Foreign Application Priority Data
Mar. 26, 2020 (EP) ..................................... 20290034

(51) Int. Cl.
*F28F 1/02*      (2006.01)
*F16J 15/06*     (2006.01)
(Continued)

(52) U.S. Cl.
CPC ............... *F28F 1/022* (2013.01); *F16J 15/06* (2013.01); *F16L 37/025* (2013.01); *F16L 39/00* (2013.01);
(Continued)

(58) Field of Classification Search
CPC ........ F28F 1/022; F28F 9/06; F28F 2275/085; F16L 39/00; F16L 41/001; F16L 17/032;
(Continued)

(56) References Cited

U.S. PATENT DOCUMENTS 5,062,476 A    11/1991  Ryan et al.
5,538,079 A *  7/1996  Pawlick ................... F28F 9/06
(Continued)

FOREIGN PATENT DOCUMENTS

EP       3938727 A1    1/2022
WO    2019231209 A1   12/2019

OTHER PUBLICATIONS

International Search Report for PCT Application No. PCT/EP2021/055798 dated Jun. 10, 2021, 3 pages.
(Continued)

*Primary Examiner* — Zachary T Dragicevich
(74) *Attorney, Agent, or Firm* — Warner Norcross + Judd LLP

(57) ABSTRACT

A connector suitable to be connected to a multi port extruded tube comprises a socket suitable for an end section of a multi port extruded tube to inserted into the socket along a linear insertion direction, whereby the socket contains an end section receiving space suitable to receive the end section of a multi port extruded tube, the end section receiving space bordering a first opening suitable for a multi port extruded tube to extend through it, whereby a cap arranged inside the socket such that the cap can slide from a forward position that is closer to the first opening to a backward position that
(Continued)

is further away from the first opening, the cap having an outer circumferential surface whereby a sealing is provided inside the socket that contacts the outer circumferential surface of the cap in the forward position of the cap.

15 Claims, 12 Drawing Sheets

(51) Int. Cl.
*F16L 37/02* (2006.01)
*F16L 39/00* (2006.01)
*F28F 9/06* (2006.01)

(52) U.S. Cl.
CPC .............. *F28F 1/025* (2013.01); *F28F 9/06* (2013.01); *F28F 2230/00* (2013.01); *F28F 2275/085* (2013.01)

(58) Field of Classification Search
CPC ....... F16L 17/035; F16L 37/025; F16L 37/04; F16L 37/505
See application file for complete search history.

(56) References Cited

U.S. PATENT DOCUMENTS

| | | |
|---|---|---|
| 10,208,879 B2 | 2/2019 | Hunt et al. |
| 2003/0131981 A1 | 7/2003 | Kohler et al. |
| 2008/0251245 A1 | 10/2008 | Gorbounov et al. |
| 2017/0196127 A1 | 7/2017 | Seidl et al. |
| 2017/0219297 A1* | 8/2017 | Janezich ................ F28F 9/06 |
| 2022/0065555 A1* | 3/2022 | Thomsen ................ F28F 9/06 |

OTHER PUBLICATIONS

Machine assisted English translation of WO2019231209 obtained from https://patents.google.com/patent on Sep. 13, 2022, 7 pages.

* cited by examiner

CONNECTOR SUITABLE TO BE CONNECTED TO A MULTI-PORT EXTRUDED TUBE

CROSS-REFERENCE TO RELATED APPLICATIONS

This application is the National Stage of International PCT Application No. PCT/EP2021/055798 filed on 8 Mar. 2021, which claims priority to and all advantages of European Patent Application No 20290034.6 filed on 26 Mar. 2020, the contents of which are hereby incorporated by reference.

FIELD OF THE INVENTION

The invention relates to a connector that is suitable to be connected to a multi-port extruded tube. The invention also relates to an assembly of such a connector and a multi-port tube. The invention also relates to a method for producing such an assembly.

BACKGROUND OF THE INVENTION

Multi-port extruded tubes are known. Particularly they are known in their use in cooling systems, for example in cooling systems for vehicles. In this particular field of use, but also in other fields of use of multi-port extruded tubes the need arises to connect the multi-port extruded tube to other parts, for example to a hose. U.S. Pat. No. 10,208,879 B2 shows such a connector.

In the design known from U.S. Pat. No. 10,208,879 B2 the multi-port extruded tube (or "flat tube" as it is called in U.S. Pat. No. 10,208,879 B2) is inserted into the connector in a sliding manner. When being slid into the connector, the multi-port extruded tube passes through the seal 56 as shown in FIG. 3 of U.S. Pat. No. 10,208,879 B2. Multi-port extruded tubes of the kind used in U.S. Pat. No. 10,208,879 B2 are typically cut off from a longer extruded part. Typically, when the multi-port extruded tube is cut off from the longer extruded tube, this is performed by way of scoring a long extruded tube and simply braking the tube at the score-line or by a simple cutting action without any smoothing of the cutting edges being performed thereafter. This leads to the problem, that a multi-port extruded tube that is inserted into the connector as known from U.S. Pat. No. 10,208,879 B2 can damage the seal 56 as it is being pushed through this seal.

Given this background, the problem to be solved by the invention is to suggest a connector that is suitable to be connected to a multi-port extruded tube, whereby the connector is to provide a good and reliable sealing inside the connector.

BRIEF SUMMARY OF THE INVENTION

Disclosed is a connector suitable to be connected to a multi-port extruded tube, the connector comprising a socket suitable for an end section of a multi-port extruded tube to be inserted into the socket along a linear insertion direction. The socket contains an end section receiving space suitable to receive the end section of a multi-port extruded tube, the end section receiving space bordering a first opening suitable for a multi-port extruded tube to extend through it. The connector further comprises a cap arranged inside the socket such that the cap can slide from a forward position that is closer to the first opening to a backward position that is further away from the first opening. The cap has an outer circumferential surface whereby a sealing is provided inside the socket that contacts the outer circumferential surface of the cap in the forward position of the cap, the sealing being in a compressed state when the cap is in the forward position, and whereby at least a part of the sealing expands into a space that was occupied by a part of the cap when the cap was in the forward position and is given free when the cap slides from the forward position into the backward position.

The connector according to the invention is suitable to be connect to a multi-port extruded tube. For this purpose the connector comprises a socket that is suitable for an end section of a multi-port extruded tube to be inserted into the socket along a linear insertion direction.

The socket contains an end section receiving space that is suitable to receive the end section of a multi-port extruded tube. The end section receiving space has a first opening that is suitable for a multi-port extruded tube to extend through it.

According to the invention, a cap is arranged inside the socket such that the cap can slide from a forward position that is closer to the first opening to a backward position that is further away from the first opening.

In a preferred embodiment, the connector has one cap guiding surface or in a preferred embodiment at least one cap guiding surface and even in a more preferred embodiment several cap guiding surfaces. In a preferred embodiment, the cap slides along a cap guiding surface at least for a part of the way that the cap travels from the forward position to the backward position. There might be a sequence of cap guiding surfaces. As the cap travels from the forward position to the backward position, it might be guided by a cap guiding surface that is arranged closer to the forward position first and then later be guided by a further cap guiding surface that is arranged closer to the backward position. In a preferred embodiment, the cap travels along a straight line as it moves from the forward position towards the backward position.

In a preferred embodiment, the cap is guided by the cap guiding surface (in the embodiments, where there is only one cap guiding surface) or is guided by the plurality of cap guiding surface (for the embodiments where there is a plurality of cap guiding surfaces) to travel along the straight line from the forward position towards the backward position. In a preferred embodiment, the cap is a rectangular cap. In a preferred embodiment, the cap has an extend into a first direction that is larger then the extent into a second direction, whereby by the second direction is perpendicular to the first direction. In a preferred embodiment, the cap, especially when it is a plate, has an extend into a third direction that is perpendicular to the first direction and perpendicular to the second direction, which is smaller than the extend in the first direction, but can be smaller than the extent in the second direction or can be of the same extent as in the second direction. In a preferred embodiment, the extent of the cap in the first direction is at least double the extent in the second direction, more preferably more than five times the extent in the second direction, more preferably more than 10 times the extent into the second direction. In a preferred embodiment, the cross-section of the cap has the same shape of its cross-section then the shape of the cross-section of the multi-port extruded tube. In a preferred embodiment, the cross-sectional area of the cap is slightly larger than the cross-sectional area of the multi-port extruded tube.

In a preferred embodiment the cap has an interior space that is suitable to receive a part of the end section of a multi-port extruded tube that is inserted into the end section receiving space. Embodiments are, however also feasible, where the cap is not designed to surround/receive a part of the end section of the multi-port extruded tube, but is designed as a plate that can be placed in front of the end of the multi-port extruded tube. It has been found that in the manufacture of the multi-port extruded tube a clear cut can be made so that the outer circumferential surface of the multi-port extruded tube is at a sharp 90° angle a front face of the multi-port extruded tube. It has been found that already this sharp 90° angle can lead to damage at the sealing, if this sharp edge of the e multi-port extruded tube were to come into contact with the sealing while the multi-port extruded tube is pushed into the socket. The inventors have found that already the embodiment of placing a cap that is designed as a plate that is placed in front of the front face of the multi-port extruded tube prevents such a sharp edge to damage the sealing. In such a design, the cap designed as a plate can have pins or projections that project from the plate towards the multi-port extruded tube and that can be inserted into at least some of the ports of the multi-port extruded tube to align the cap in the shape of a plate with the multi-port extruded tube.

According to the invention the cap has an outer circumferential surface. In a preferred embodiment, a part of the outer circumferential surface is made up by a plane surface. In a preferred embodiment, a part of the circumferential surface can be made up by a series of partial surfaces, whereby each partial surface of the series is bordered by a further partial surface of the series, such that the series of partial surfaces makes up a ring. In a preferred embodiment, the ring encircles the interior space, if in the specific embodiment such an interior space is present or encircles a fluid opening of the cap that is designed as a through hole through the entire cap. In a preferred embodiment at least two of the partial surfaces of the series of partial surfaces are each made up by a plane surface. A rectangularly shaped cap can be made up by a series of four partial surfaces, whereby the series has two long, rectangular surfaces that run in parallel to each other. Each of the long, rectangular partial surfaces is joined by a smaller partial surface that is either quadratic or also rectangular, whereby these smaller partial surfaces are arranged at 90° to the longer rectangular surfaces. To make the cap quasi-rectangular, which is also a preferred embodiment, the longer rectangular partial surfaces are kept, but the smaller partial surfaces are made up of partial surfaces that form part of a cylinder. These partially cylindrical smaller partial surfaces provide the cap with rounded ends. It is often found that multi-port extruded tubes have rounded ends, as for example shown in FIG. 1 of U.S. Pat. No. 10,208,879 B2. In a preferred embodiment, the shape of the cross-section of the outer circumferential surface of the cap resembles the shape cross-section of the multi-port extruded tube, but might be bigger in size.

According to the invention a sealing is provided inside the socket that contacts the outer circumferential surface of the cap in the forward position of the cap, whereby the sealing is in a compressed state, when the cap is in the forward position. The sealing is provided to prevent any fluid that flows out of the end of the end section of the multi-port extruded tube that has been placed into the end section receiving space from flowing backwards along the multi-port extruded tube and out of the first opening (the first opening being provided for the multi-part extruded tube to extend through it). "A compressed state" of the sealing is understood to be a state, in which a surface of the sealing has been displaced from the position it would take in the normal state of the sealing. The normal state of the sealing is understood to be the state of the sealing that the sealing will take up, if it is left alone and untouched, especially unstretched by any influence from the outside. A sealing can, for example, be in a compressed state, if the sealing is made as an O-ring and the O-ring is expanded radially outward. A compressed state of the sealing can also be seen in a sealing that has a main body and a lip extending from the main body, whereby in the compressed state the lip has been swiveled relative to the basic body away from a position that the lip would normally take in the normal state of this seal.

According to the invention at least a part of the sealing expands into a space that was occupied by a part of the cap when the cap was in the forward position and is given free when the cap slides from the forward position into the backward position. In the first position a part of the cap hence displaces a part of the sealing away from a space, which in the forward position is then occupied by that part of the cap. As the cap leaves the forward position and hence gives free the space that was occupied by a part of the cap, when the cap was in the forward position the sealing expands into this space. In a preferred embodiment, the sealing is still partially compressed even after it has expanded into the space that was occupied by a part of the cap when the cap was in the forward position and was given free when the cap slit from the forward position into the backward position. The sealing is still compressed, for example to a lesser extent that it was previously compressed. It still has the ability to press against a surface and provide a sealing at this surface. In a preferred embodiment, this surface that the still partially compressed sealing presses against is an outer circumferential surface of the multi-port extruded tube. Hence even in the state, when the sealing has expanded into a space that was occupied by a part of the cap when the cap was in the forward position, the sealing can still perform a sealing function and prevent a fluid that exits the multi-part extruded tube at the end of the end section to flow backwards along the multi-port extruded tube and out of the first opening.

If in a preferred embodiment the cap has an interior space suitable to receive a part of the end section of a multi-port extruded tube that is inserted into the end section receiving space, the cap can prevent the seal from being damaged by a possibly roughly cut and/or sharply cut end of the end section of a multi-port extruded tube. The cap in the forward position compresses the sealing and in doing so holds the sealing out of the way of the end section of the multi-port extruded tube. At the same time by way of providing the interior space, the cap takes up the possibly roughly cut and/or sharply cut end of the end section of the multi-port extruded tube and hence prevents that the possibly roughly cut and/or sharply cut end of the end section of the multi-port extruded tube comes into contact with the sealing and hence prevents damage to the sealing being inflicted by a possibly roughly cut end of the end section of the multi-port extruded tube. In the embodiments where the cap is a plate, placing the plate in front of the roughly cut and/or sharply cut end also prevents this end to come into contact with the sealing.

At the same time by way of the specific design provided by the invention, namely by way of the cap giving free a space that was previously occupied by a part of the cap when the cap was in the forward position when the cap slides from the forward position into the backward position, the design according to the invention allows the sealing to seal directly against the outer circumferential surface of the multi-port extruded tube. This reduces the number of sealing surfaces and reduces the number of ways that fluid could possibly flow backward from the end of the end section of the multi-port extruded tube towards the first opening.

For the embodiments where the cap has an interior space to take up a part of the end section of the multi-port extruded tube, this design reduces the efforts of having to seal the outer circumferential surface of that part of the end section side of the multi-port extruded tube that is arranged inside the interior space against the walls of the cap that border this interior space. As the cap is in the forward position and compresses the sealing, a bypass for fluid could be seen by way of flowing out of the end of the end section of the multi-port extruded tube, but flowing in between the surfaces of the cap that border the interior space and the outer circumferential surface of the multi-port extruded tube. Because of the design of the invention, which allows the sealing to seal directly against the outer circumferential surface of the multi-port extruded tube when the cap has been moved into the backward position, this flow path between the surfaces of the cap that border the interior space and the outer circumferential surface of the multi-port extruded tube might still exist, but any fluid flowing through this flow path will not reach the first opening as the sealing seals directly against the outer circumferential surface of the multi-port extruded tube at a position further downwards from the cap that has reached its backward position.

In a preferred embodiment the cap has an initial position. The initial position might be the same position as the forward position. That means that the connector might be sold in a state, where the cap is in the forward position. In such a design, however, the cap would hold the sealing in its compressed state for a substantial period of time, namely until the connector has been delivered to the customer and has been put in place at the customer. It might be preferred that the sealing is not held in this compressed state for a longer period of time, for example to prevent the restoring forces of the sealing towards its normal position to weaken. In a preferred embodiment, the initial position of the cap is different to the forward position of the cap. In a preferred embodiment, the initial position is closer to the first opening than the forward position. In a preferred embodiment, the connector has a delivery state, which is the state, in which the connector is delivered to the customer prior to being connected to the multi-port extruded tube. In its delivery state the cap is in the initial position. The Connector might have means for holding the cap in a specific initial position. Such means could be inwardly pointing rims or balls that point inwards into the socket and which are arranged on either side of the cap when the cap is in the initial position. This inwardly pointing rims or balls are of a small height such that they are able to keep the cap in the initial position in the delivery state of the connector, but allow the cap to easily pass over the rim or the balls, when the cap is to be moved from the initial position towards the forward position, for example when the end section of a multi-port extruded tube has been inserted into the socket through the first opening and is pushed further into the socket, thereby pushing the cap from the initial position towards the forward position. In an alternative embodiment, the connector might be arranged in such a manner that the first opening is designed such that it does not let the cap pass through the first opening. The circumference of the first opening hence would prevent the cap from leaving the socket. In such an embodiment, the initial position of the cap could be a free floating position somewhere between the first opening and the forward position. In the delivery state in such an embodiment, the cap would be able to freely glide between the first opening, where it is stopped from leaving the connector, and the forward position.

In a further alternative embodiment, the initial position of the cap is outside a housing of the connector. In such a design, the delivery state of the connector would be a system of the remaining parts of the connector on the one hand and the cap that has not been inserted into the socket yet on the other hand. In such a design, a part of the end section of the multi-port extruded tube could be inserted into the interior space of the cap, while the cap is still outside the socket of the connector. The multi-port extruded tube with the cap being slid over the end section of the multi-port extruded tube would then be jointly inserted through the first opening into the socket and moved towards the forward position and through the forward position into the backward position. If the cap is designed as a plate, the plate can be set against the end of the multi-port extruded tube outside a connector housing and inserted jointly with the multi-port extruded tube through the first opening. Means could be provide at a cap that is a plate that hold the cap at the end of the multi-port extruded tube, for example projections that project into some of the ports of the multi-port extruded tube.

In a preferred embodiment, the cap has at least one fluid opening through which a fluid can pass. In a preferred embodiment, the cap has an interior space opening, which is provided at the side of the cap, from which the end section of the multi-port extruded tube is to be inserted into the end section receiving space. In a preferred embodiment, the fluid opening of the cap is arranged on the opposite side of the cap relative to the side at which the interior space opening is provided. In a preferred embodiment the fluid opening connects the interior space with the outside of the cap at the opposite end of the interior space opening.

In a preferred embodiment, especially with a cap that is a plate, the fluid opening is a through hole that connects one side of the plate with the opposite side of the plate.

In a preferred embodiment, the fluid opening of the cap is smaller than the interior space opening. In a preferred embodiment, the fluid opening of the cap has a longitudinal shape. In a preferred embodiment, the cross-sectional area of the fluid opening of the cap is at least of the same magnitude, preferably at least of the same size as the joint cross-sectional area of the ports of the multi-port extruded tube. A multi-port extruded tube typically has a multitude of channels. At the end of the end section the channels of the multi-port extruded tube each have an end opening (a port). The joint cross-sectional area is the sum of the individual cross-sectional areas of the ports at the end of the end section of the multi-port extruded tube. In order to prevent a pressure drop across the fluid opening of the cap, it is preferred that the cross-sectional area of the fluid opening of the cap is as large as the cross-sectional area that the fluid passes through as it leaves the multi-port extruded tube at its end. In a preferred embodiment, the cross-sectional area of the fluid opening of the cap is even larger than the joint cross-sectional area in order to prevent any pressure loss across the fluid opening. In order to provide the cap with stability and to reduce the weakening effect of a large fluid opening bars might be provided that cross the fluid opening and stabilize the walls of the cap that border the fluid opening.

In a preferred embodiment the sealing has a basic body, which might be rectangular or elliptical or round in cross section and has a lip that extends from this basic body. The lip can be designed to swivel relative to the basic body about the joint, where the lip joins the basic body. In addition or alternatively the lip can be slim in cross section, so that the tip of the lip can be bent away from a normal position upon application of a force. In a preferred embodiment, the sealing of this type has a basic body that is ring shaped and hence surrounds a central opening. The lip preferably is arranged in such a way that it points inwards or runs at an angle inwardly and hence reduces the central opening of the basic body. The lip is preferably designed in such a way, that by application of a force that points radially outward, the lip can be displaced radially outward. If the lip has been displaced radially outward, a restoring force is created that wants to restore the lip into the undisplaced position.

Designs are feasible, where the sealing is an O-ring. However, it is preferred that the sealing is not an O-ring. Multi-port extruded tubes often have a longitudinal cross section that is either rectangular in cross-section or quasi rectangular, with the small sides being rounded. Experience has shown, that bodies of such a cross-section are difficult to be sealed with O-rings. It is often difficult to have the O-ring follow the exterior shape of such bodies especially at the corners of such bodies. Hence it is preferred that the sealing has a basic body and a lip extending from the basic body. Experience has shown that such sealings can be more easily made to have rectangular or quasi rectangular central opening and that the lip can still seal well against a rectangular element, for example a multi-port extruded tube being inserted into such an rectangular opening of the basic body and the lip of the sealing.

In a preferred embodiment the socket has a recess. In a preferred embodiment at least a part of the sealing is arranged inside the recess when the cap is in the forward position. In a preferred embodiment, at least a part of the sealing is also arranged inside the recess, when the cap is in the backward position. The part of the sealing that is arranged inside the recess when the cap is in the forward position might be larger than the part of the sealing that is arranged inside the recess when the cap is in the backward position. The sealing hence might move slightly out of the recess after the cap has left the forward position. For example if the sealing is an O-ring that has been expanded by the cap into the recess, when the cap is in the forward position, the O-ring might partially leave the recess as the cap moves away from the forward position and gives free a space that it has occupied as it was in the forward position. In a design, where the sealing has a basic body and a lip extending from the basic body, the connector can be designed in such a way that the basic body is fully arranged inside the recess and remains in the recess, regardless of the position of the cap, while the lip changes its position in dependence of the position of the cap. In such a design, the recess might have a pocket, in which the basic body is arranged. The pocket might have an inner wall that closes a part of the recess towards the end section receiving space, thereby forming the pocket within the recess.

In a preferred embodiment the socket has a cap abutment surface. In a preferred embodiment of the cap abuts against the cap abutment surface in the backward position. The cap abutment surface can be used to define the final position of the cap and hence the final position of the multi-port extruded tube within the socket. The cup abutment surface can also be used to give the worker that connects the connector to the multi-port extruded tube a feeling for having the multi-port extruded tube inserted into the socket as much as intended by the designer of the connector. The worker that inserts the end section of the multi-port extruded tube into the socket will simply have to push the multi-port extruded tube as far into the socket as it will go. The amount, how far the end section of the multi-port extruded tube will go into the sock can be designed by appropriate placement of the cap abutment surface.

In a preferred embodiment the socket has a guiding sleeve that is arranged at least in part in the socket. In a preferred embodiment the guiding sleeve has a guide surface that partially delimits the end section receiving space. The guiding sleeve can be a permanent part of the connector. The guiding sleeve can be made as one piece with further elements of the connector. The guiding sleeve can, however, be a separate part of the connector, but is a separate part of the connector that is fixedly attached to other parts of the connector. The attachment of the guiding sleeve to other parts of the connector can be made by gluing, welding or frictional engagement or even interference fit or a clip and recess arrangement can be provided between the guiding sleeve and the further part of the connector that the guiding sleeve is connected to. The guiding sleeve might have a protruding clip that engages into a recess of a further part of the connector as the sleeve is inserted into the socket.

The guiding sleeve can have a front end, whereby a recess delimiting surface is arranged at the front end of the guiding sleeve. The front end of the guiding sleeve preferably is the end of the guiding sleeve that is arranged deepest inside the socket. This front end can be used to delimit the recess, in which at least a part of the sealing is arranged. This design also allows easy assembly of the connector. It allows for a connector housing to be provided, whereby the socket is made as part of the connector housing. The socket inside the connector housing might have a step arrangement in the walls that delimit the socket. The sealing might be placed in the area of the step. The guiding sleeve might then be inserted into the socket, whereby a surface of the front end of the guiding sleeve is used to make a recess out of the step that has already been provided in the connector housing. The front end of the guiding sleeve might also provide the inner wall that makes a pocket in the recess.

In an alternative embodiment, the guiding sleeve in the delivery state of the connector is not attached as to the connector house, but a loose part. When assembling the connector, the guide sleeve might be pushed over the end section of the multi-port extruded tube. Afterwards the cap might be arranged over the end of the end section of the multi-port extruded tube, while in an alternative embodiment, the cap is arranged inside the socket of the connector. When assembling the connector in this embodiment, the multi-port extruded tube with the guiding sleeve arranged on the end section of the multi-port extruded tube is then inserted into the socket of the connector. In a preferred embodiment, the guide sleeve then has means to fixedly connect itself to the remaining parts of the connector, for example a clip and recess arrangement. Alternatively, the guiding sleeve might be glued, welded or arranged with frictional engagement or even interference fit into the remaining parts of the connector. In specific embodiments of the invention, the guiding sleeve might also be fixedly attached to the multi-port extruded tube, for example might be glued to the multi-port extruded tube or might be attached to the multi-port extruded tube by way of frictional engagement. Designs are also feasible, where connecting elements are attached to the multi-port extruded tube, like for example the locking taps 66 in the design known from U.S. Pat. No. 10,208,879 B2 and that these connecting means are used to connect the multi-port extruded tube to the guiding sleeve.

In the embodiments, where the guiding sleeve has a guide surface, the guide surface might be used to guide the end section of the multi-port extruded tube as it is pushed into the socket. The guide surface might be used to guide the end section of the multi-port extruded tube towards the interior space of the cap for the embodiments that have an interior space.

In a preferred embodiment, the guiding sleeve has a cap abutment surface. In a preferred embodiment, the cap abutment surface on the guiding sleeve defines the closest position that the cap can take up in relation to the first opening. The cap abutment surface on the guiding sleeve can be used to define the initial position of the cap.

In a preferred embodiment, the connector is made up of plastic parts. The connector in a preferred embodiment has a connector housing. In a preferred embodiment, the connector housing has a fluid channel. In a preferred embodiment, the connector housing has an inlet opening and has an outlet opening. In a preferred embodiment, the channel inside the housing of the connector leads from the inlet opening to the outlet opening. In an alternative embodiment, the channel only has one channel opening in the housing. In a preferred embodiment, the socket has an end opening that opens towards the channel. In a preferred embodiment, the end opening is arranged on the opposite side of the first opening. The end opening allows fluid that flows out of the end of the end section of the multi-port extruded tube to flow into the channel. This fluid preferably passes through the fluid opening in the cap. The fluid that leaves the end of the end section of the multi-port extruded tube hence preferably flows out of the end of the multi-port extruded tube and through the fluid opening of the cap and through the end opening of the socket into the channel of the connector housing.

Designs are feasible, like the one shown in U.S. Pat. No. 10,208,879 B2, where the fluid flows through the channel from an inlet opening in the connector housing to an outlet opening in the connector housing and fluid from the multi-port extruded tube either flows out of the multi-port extruded tube and into the channel thereby joining the fluid that is flowing through the channel from the inlet opening to the outlet opening. Or a part of the fluid that flows from the inlet opening of the connector housing through the channel to the outlet opening of the connector housing branches off from the channel and flows through the end and into the multi-port extruded tube. In a design, where the connector housing only has one channel opening, the fluid flows from the multi-port extruded tube through the end opening into the channel and out of the channel opening of the connector housing or flows from the channel opening of the connector housing through the channel and the end opening into the multi-port extruded tube.

In a preferred embodiment, the channel in the connector housing has a longitudinal extent. In a preferred embodiment, the linear insertion direction along which the multi-port extruded tube can be inserted into the socket is at an angle of 90° to the flowing direction in the channel.

The assembly according to the invention has a connector according to the invention and has a multi-port extruded tube, whereby an end section of the multi-port extruded tube is arranged in the socket.

In a preferred embodiment, the multi-port extruded tube has a longitudinal extent. A preferred embodiment, the multi-port extruded tube has channels that run inside the multi-port extruded tube to the ports at the end of the multi-port extruded tube. In a preferred embodiment, the channels run in parallel to each other and in the preferred embodiment run parallel to the longitudinal extent of the multi-port extruded tube. In a preferred embodiment, the linear insertion direction, which is the direction, in which the multi-port extruded tube is inserted into the socket, runs in parallel to the channels in the multi-port extruded tube and/or in parallel (or in the same direction) to the longitudinal direction of the multi-port extruded tube.

In a preferred embodiment the multi-port extruded tube has a height that is taken from the range of 1 mm to 15 mm, more preferably that is taken from the range of 2 mm to 10 mm. In a preferred embodiment the multi-port extruded tube has a width that is taken from the range of 50 mm to 300 mm, more preferably that is taken from the range of 75 mm to 200 mm. In a preferred embodiment the multi-port extruded tube has a length that is taken from the range of 100 mm to 2000 mm, more preferably that is taken from the range of 100 mm to 1500 mm.

In a preferred embodiment, the socket is larger then the end section receiving space. In embodiments, where a guiding sleeve is used and where the guiding sleeve is a separate element to other parts of the connector, for example a separate element to a connector housing, the connector housing might have a socket, which is large enough to also receive the guiding sleeve. The end section receiving space then is a smaller space than the socket, namely the space that is in a preferred embodiment delimited in part by a guide surface arranged on the guide sleeve that is arranged in the socket. However, also embodiments are feasible, where the socket has the same shape than the end section receiving space, for example, where no guide sleeve is present and guide surfaces that partially delimit the end section receiving space are provided directly on the connector house.

In a preferred embodiment, the first opening is a longitudinal opening. A longitudinal opening is an opening that has an extend into a first direction that is larger then the extent into a second direction, whereby by the second direction is perpendicular to the first direction. In a preferred embodiment, the extent of the first opening in the first direction is at least double the extent in the second direction, more preferably more than five times the extent in the second direction, more preferably more than 10 times the extent into the second direction. In a preferred embodiment, the first opening has the same shape of its cross-section then the shape of the cross-section of the multi-port extruded tube. In a preferred embodiment, the cross-sectional area of the first opening is slightly larger than the cross-sectional area of the multi-port extruded tube in order to facilitate the insertion of the multi-port extruded tube into the first opening. In a preferred embodiment, where a guiding sleeve is provided, the first opening might be provided as part of the guiding sleeve. In a preferred embodiment, the interior space of the cap has an end section abutment surface. In a preferred embodiment the end section of the multi-port extruded tube abuts against the end section abutment surface.

In a preferred embodiment, the multi-port extruded tube has an outer circumferential surface. In a preferred embodiment, the sealing seals against the outer circumferential surface, when the cap is in the backward position. In a preferred embodiment the sealing prevents fluid from flowing around the outside of the circumferential surface towards the first opening.

In a preferred embodiment, the multi-port extruded tube has an outer circumferential surface and the cap has an outer circumferential area. In a preferred embodiment, the outer circumferential area of the multi-port extruded tube extends in parallel to the outer circumferential area of the cap.

In a preferred embodiment, a sleeve that sits on the multi-port extruded tube is provided, whereby the sleeve is at least partially, preferably completely arranged inside the guiding sleeve. In a preferred embodiment, the sleeve has an abutment wall that extends away from the circumferential surface of the multi-port extruded tube in a preferred embodiment. The connector has a recess that receives the abutment wall of the sleeve. In a preferred embodiment, the arrangement of the abutment wall in the recess of the connector is an indication to the worker that the multi-port extruded tube has been fully inserted into the connector.

In a preferred embodiment, the multi-port extruded tube has a cross section in a plane perpendicular to the insertion direction in which the extent of the multi-port extruded tube in this cross-section in one direction is larger than in a direction perpendicular to the one direction. In a preferred embodiment, the multi-port extruded tube has an extend into a first direction that is larger than the extent into a second direction, whereby by the second direction is perpendicular to the first direction and whereby the first direction and the second direction are perpendicular to the longitudinal extent of the multi-port extruded tube. In a preferred embodiment, the extent of the multi-port extruded tube in the first direction is at least double the extent in the second direction, more preferably more than five times the extent in the second direction, more preferably more than 10 times the extent into the second direction.

In the method according to the invention for producing the assembly according to the invention,
- a connector according to the invention is provided with the cap arranged inside the socket and arranged in the forward position
- a multi-port extruded tube is provided, • an end section of the multi-port extruded tube is inserted into the socket such that the interior space of the cap receives a part of the end section of a multi-port extruded tube, and
- the end section of the multi-port extruded tube is further extended into the socket, whereby the multi-port extruded tube pushes the cap from the forward position towards the backward position.

In an alternative method according to the invention for producing the assembly according to the invention,
- a connector according to the invention is provided with the cap that is a plate arranged inside the socket and arranged in the forward position
- a multi-port extruded tube is provided,
- an end section of the multi-port extruded tube is inserted into the socket such that the end of the end section of the multi-port extruded tube contacts the cap that is a plate, and
- the end section of the multi-port extruded tube is further extended into the socket, whereby the multi-port extruded tube pushes the cap from the forward position towards the backward position.

In an alternative method according to the invention for producing the assembly according to the invention,
- a connector according to the invention is provided with the cap not having been inserted in the socket, but the sealing being arranged in the socket,
- a multi-port extruded tube is provided,
- a part of the end section of the multi-port extruded tube is into the interior space of the cap,
- the end section of the multi-port and the cap sitting on the part of the end section that has been introduced into the interior space of the cap is inserted into the socket,
- the end section of the multi-port and the cap sitting on the part of the end section that has been introduced into the interior space of the cap is further inserted into the socket such that the cap passes through the forward position and is moved from the forward position towards the backward position.

In an alternative method according to the invention for producing the assembly according to the invention,
- a connector according to the invention is provided with the cap not having been inserted in the socket, but the sealing being arranged in the socket,
- a multi-port extruded tube is provided,
- the end of the end section of the multi-port extruded tube is placed against the cap that is a plate, • the end section of the multi-port and the cap at the end of the end section of the multi-port extruded tube is inserted into the socket,
- the end section of the multi-port and the cap at the end of the end section of the multi-port extruded tube is further inserted into the socket such that the cap passes through the forward position and is moved from the forward position towards the backward position.

In a preferred embodiment, the connector is used in a vehicle. The connector can be used as part of a system for the thermal management of batteries.

BRIEF DESCRIPTION OF THE DRAWINGS

In the following the invention will be described with reference to exemplary embodiments on the figures, where.

DETAILED DESCRIPTION

Figure 1:
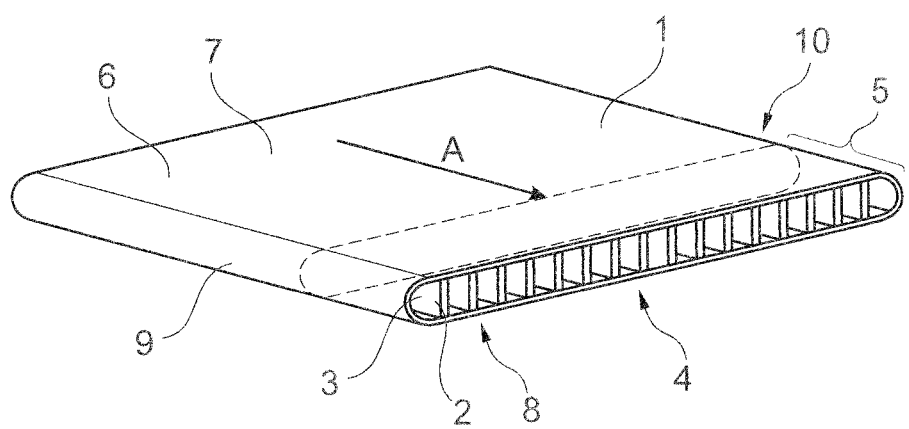
FIG. 1: shows a schematic perspective view of a multi-port extruded tube.

FIGS. 1, 6, 12, 13 show multi-port extruded tubes 1. The connector 20 according to the invention is used to be connected to such a multi-port extruded tube 1. Such a multi-port extruded tube 1 forms part of the assembly according to the invention.

The multi-port extruded tube 1 has a multitude of channels 2. The channels 2 have an longitudinal extent. The channels 2 run in parallel to each other. The longitudinal extent of each channel is in parallel to the longitudinal extent A of the multi-port extruded tube 1. Each channel 2 terminates in a port 3 at an end for the multi-port extruded tube 1 The section of the multi-port extruded tube 1 that terminates in the end 4 is referred to as the end section 5 of the multi-port extruded tube 1. The extent of the end section 5 in the longitudinal direction A of the multi-port extruded tube 1 depends on the design of the connector. The end section 5 is that part of the multi-port extruded tube 1 that is fully received by the connector.

The multi-port extruded tube 1, that can be used as part of the assembly according to the invention, is not limited to the lengths in the longitudinal direction A that is shown in FIG. 1. The multi-port extruded tube 1 that can be used as part of the assembly according to the invention can be substantially longer than shown in FIG. 1.

The multi-port extruded tube 1 according to the invention can be made by cutting off sections from a long extruded profile. The cutting surface will be the surface that surrounds the ports 3. It is known that the cutting process can lead to the end surface of the multi-port extruded tube being of a rough shape and/or sharp shape, which can lead to damages on sealings 33, if the end 4 of the multi-port extruded tube 1 comes into contact with these sealings 33. The cutting process can also sometimes lead to chips or splints of material extending away from the end surface in directions at an angle to the longitudinal direction A.

The multi-port extruded tube 1 has an outer circumferential surface 6. The outer circumferential surface 6 is made up of several partial surfaces. In the embodiment shown in FIG. 1, the outer circumferential surface 6 is made up of a first plane rectangular partial surface 7 and a second plane rectangular partial surface 8 that is arranged in parallel to the partial surface 7. To complete the outer circumferential surface 6 of the multi-port extruded tube 1 bend partial surfaces 9,10 that have the shape of a part of the outer circumferential surface of a cylinder are provided. These partial surfaces 9 and 10 join the partial services 7 and 8 at opposite ends.

In the embodiment of the assembly according to the invention as shown in FIGS. 2 to 5 and 7 to 11 the connector 20 according to the invention has a socket 21 that is suitable for an end section 5 of a multi-port extruded tube 1 to be inserted into it along a linear insertion direction B. The socket 21 contains an end section receiving space 22 that is a suitable to receive the end section 5 of a multi-port extruded tube 1. The end section receiving space 22 boarders a first opening 23 that is suitable for a multi-port extruded tube 1 to extend through it.

In the embodiment of the invention shown in FIGS. 2 to 5, a cap 24 is arranged inside the socket 21 already in the delivery state of the connector 20 (initial position of the cap 24 (see FIG. 2)), such that the cap 24 can slide from a forward position (shown in FIG. 4) that is closer to the first opening 23 to a backward position (shown in FIG. 5) that is further away from the first opening 23. The cap 24 has an interior space 25 that is suitable to receive a part of the end section 5 of a multi-port extruded tube 1 (see FIG. 3, 4, 5) that is inserted into the end section receiving space 22. In the embodiment of the invention shown in FIGS. 7 to 11, the cap 24 is arranged outside the socket 21 in the delivery state of the connector 20 (see FIG. 7; initial position of the cap 24). The cap 24 will be placed onto the end 4 of the multi-port extruded tube 1 outside of the socket 21 (see FIG. 7) and will be introduced into the socket 21 as the end 4 of the multi-port extruded tube is inserted into the socket 21. The cap 24 than slides along guide surface 42 in a guiding sleeve 40 (see FIG. 8) until the cap 24 reaches the forward position (shown in FIG. 10) that is closer to the first opening 23 to a backward position (shown in FIG. 11) that is further away from the first opening 23. The cap 24 has an interior space 25 that is suitable to receive a part of the end section 5 of a multi-port extruded tube 1 (see FIG. 3, 4, 5, 8, 9, 10, 11) that is inserted into the end section receiving space 22.

Figure 5:
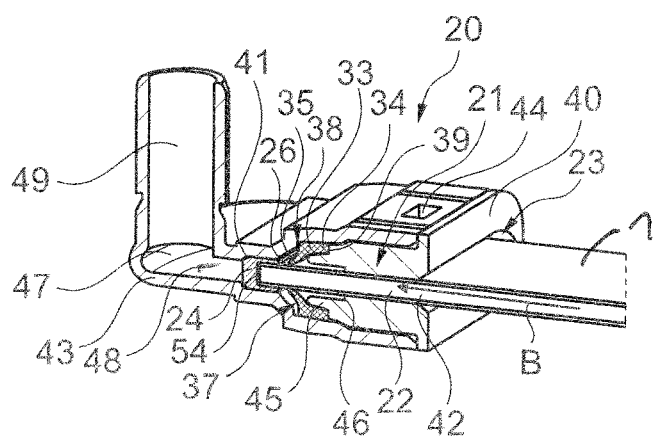
FIG. 5: shows the assembly according to FIGS. 2, 3 and 4 in a cut perspective schematic view with the multi-port extruded tube having been fully inserted into the connector and the cap being in the backward position.
Figure 6:
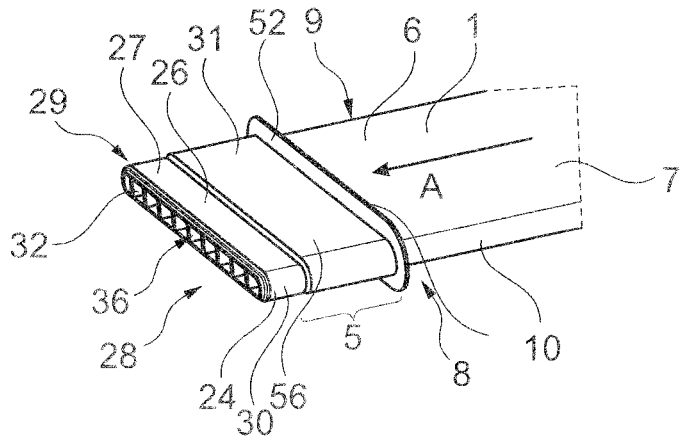
FIG. 6: shows a multi-port extruded tube in a schematic perspective view with a sleeve that sits on the multi-port extruded tube and a cap on the end of the end section of the multi-port extruded tube.
Figure 7:
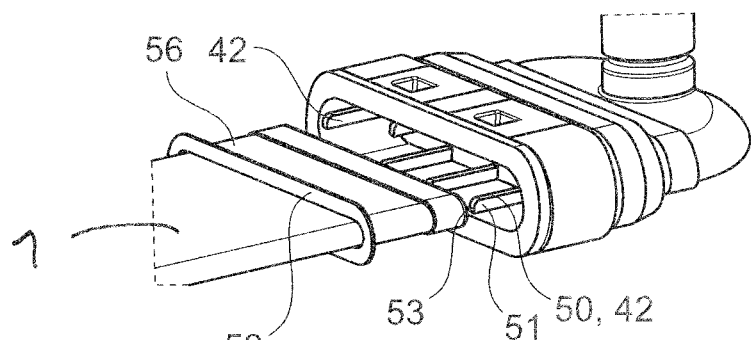
FIG. 7: shows a second assembly of a connector according to the invention and the multi-port extruded tube of FIG. 6 in a schematic perspective view with the cap being arranged outside the connector housing and the multi-port extruded tube not having been inserted into the connector yet.
Figure 8:
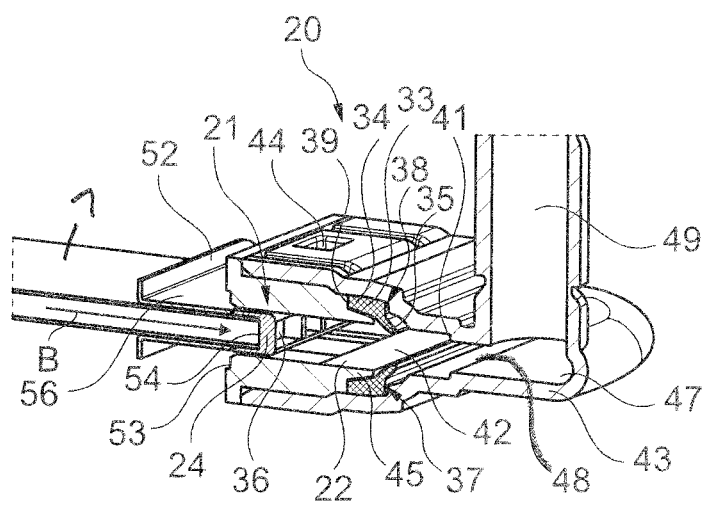
FIG. 8: shows the assembly according to FIG. 7 in a cut schematic perspective view with the multi-port extruded tube having been partially inserted into the connector.
Figure 13:
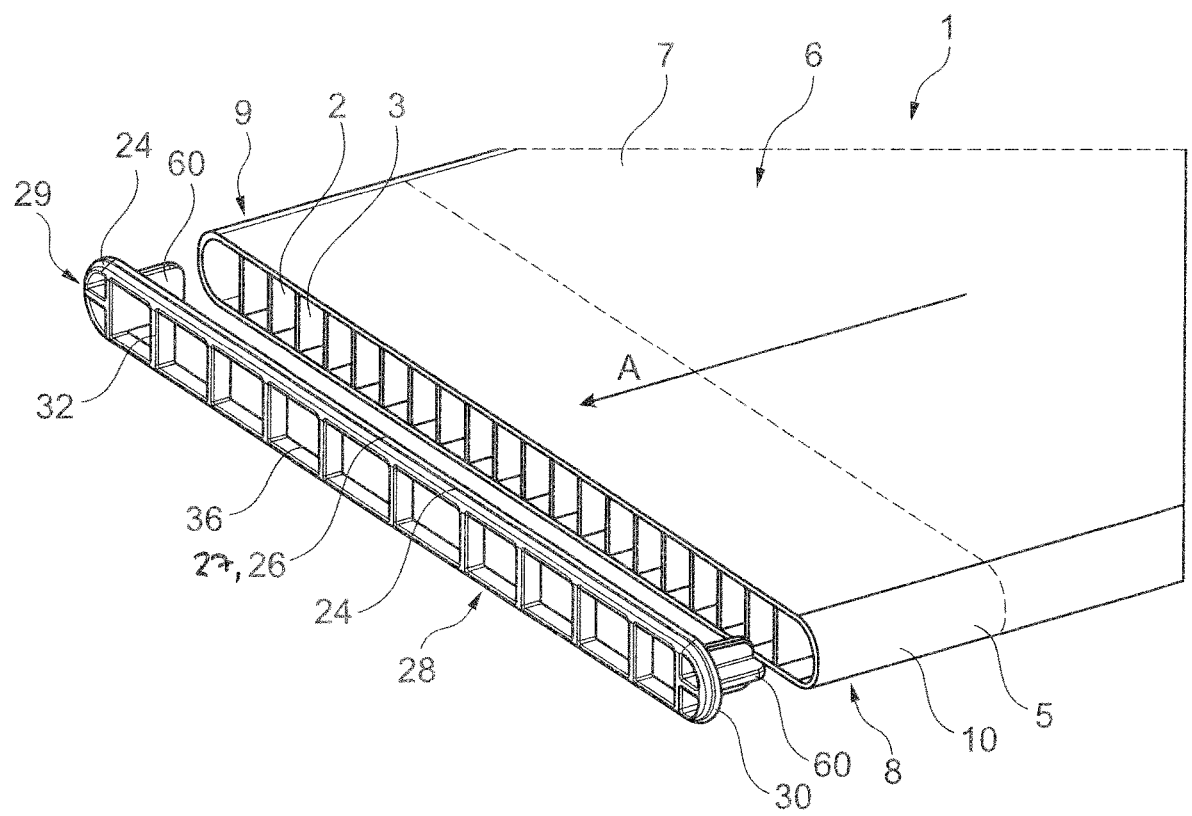
FIG. 13: shows the multi-port extruded tube of FIG. 12 in a schematic perspective view with the cap designed as a plate being slightly set off from the multi-port extruded tube.

The cap 24 has an outer circumferential surface 26. The outer circumferential surface of the cap 26 can best seen in FIG. 6, 13. FIG. 6 shows a second embodiment of the assembly according to the invention and FIG. 13 shows a third embodiment of the assembly according to the invention. However, the cap 24 shown in FIG. 6, 13 can also be used as cap 24 in the embodiment shown in the FIGS. 2 to 5 (as regards the cap shown in FIG. 13 also see FIGS. 16-19). The outer circumferential surface 26 of the cap 4 is made up of several partial surfaces. In the embodiment shown in FIG. 6, the outer circumferential surface 26 is made up of a first plane rectangular partial surface 27 and a second plane rectangular partial surface 28 that is arranged in parallel to the partial surface 27. To complete the outer circumferential surface 26 of the cap 24 bend partial surfaces 29, 30 that have the shape of a part of the outer circumferential surface of a cylinder are provided. These partial surfaces 29 and 30 join the partial surfaces 27 and 28 at opposite ends. As can be seen from FIG. 6, 13, the outer circumferential surface 6 of the multi-port extruded tube 1 is parallel to the outer circumferential surface 26 of the cap 24. The shape of the cross section of the cap 24 as defined by the outer circumferential surface 26 in a plane perpendicular to the longitudinal extent A/the linear insertion direction B is of the same shape as the cross section of the multi-port extruded tube 1 as defined by the outer circumferential surface 6 in a plane perpendicular to the longitudinal extent A.

FIG. 6 shows that the cap 24 has a large fluid opening 36. The fluid opening 36 connects the interior space 25 with the outside of the cap 24. The cap 24 is stabilized by bars 32 that cross the fluid opening 36 and stabilize the part of the cap 24 that has the partial surface 27 against the part of the cap 24 that has the partial surface 28.

The cap 24 shown in FIG. 13 has protrusions 60 that can be inserted through the ports 3 into the channels 2 to hold the cap 24 designed as a plate to the multi-port tube. The cap 24 shown in FIG. 13 in further embodiments can have more than two protrusions 60 to hold the cap 24 designed as a plate to the multi-port tube. In the embodiment shown in FIG. 13, the cap 24 is designed as a plate and has a rear surface that faces towards the end surface of the multi-port extruded tube. In the view shown in FIG. 12, this rear surface of the cap 24 rests against the end surface of the multi-port extruded tube.

Figure 9:
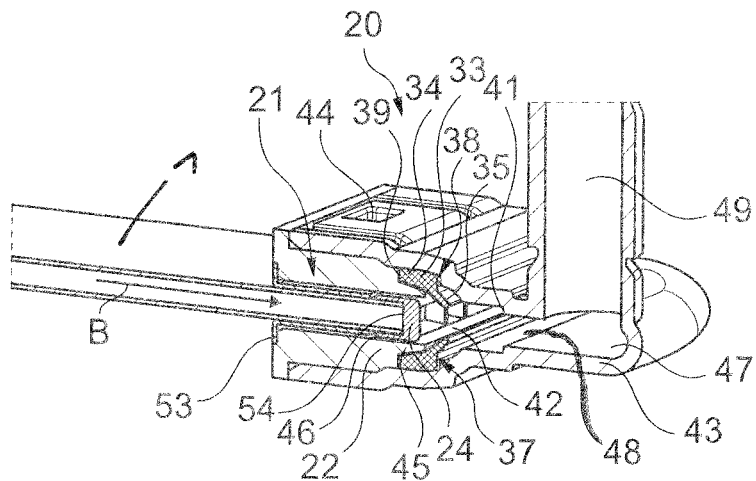
FIG. 9: shows the assembly according to FIG. 8 in a cut schematic perspective view with the multi-port extruded tube having been further' inserted into the connector.
Figure 10:
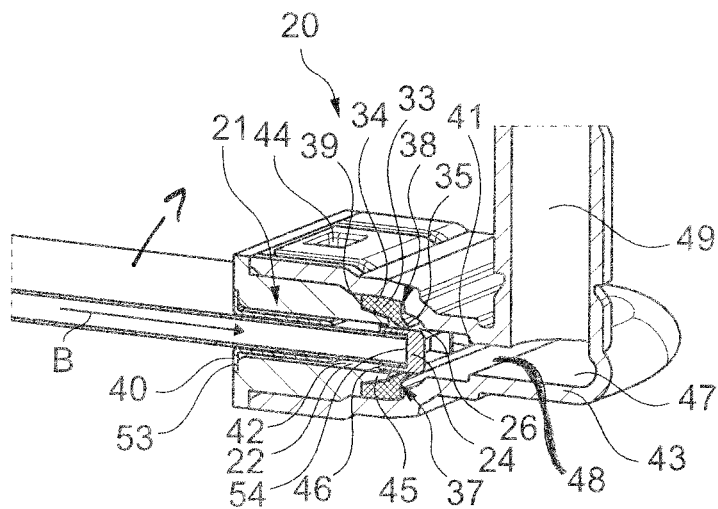
FIG. 10: shows the assembly according to FIGS. 7, 8 and 9 in a cut schematic perspective view with the multi-port extruded tube having been further inserted into the connector than in the position shown in FIG. 9, whereby the cap has reached the forward position.
Figure 14:
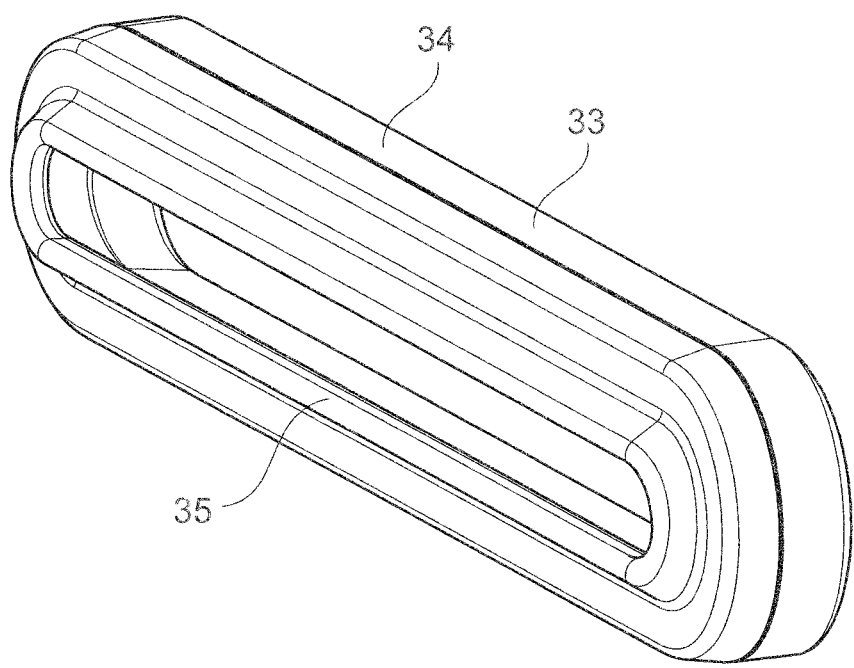
FIG. 14: shows a schematic perspective view of a sealing that can be used as part of the assembly.
Figure 15:
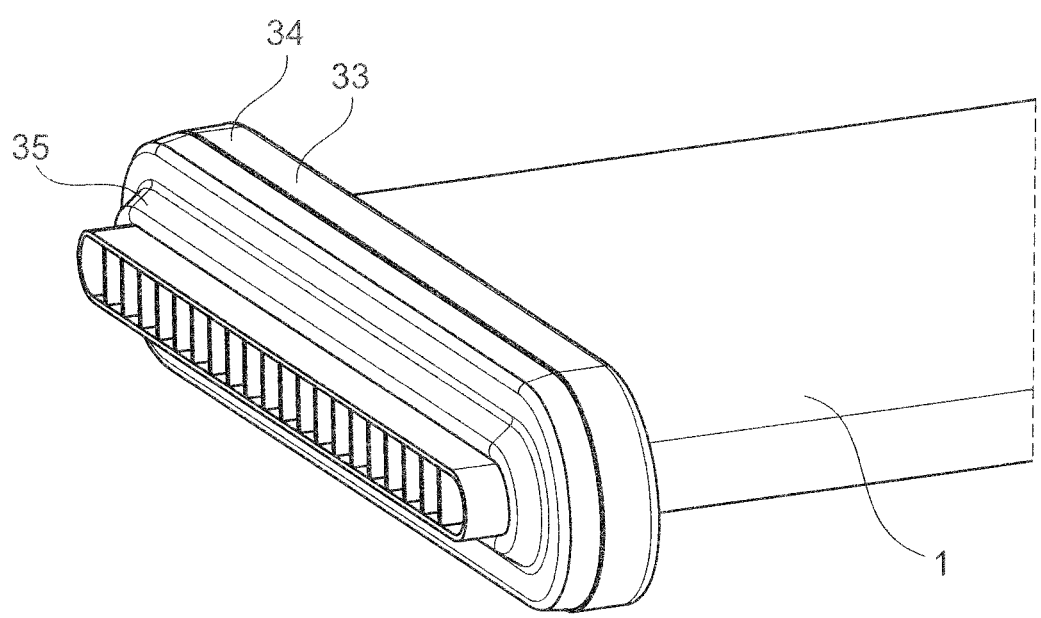
FIG. 15: shows a schematic view of the sealing of FIG. 14 set onto a multi-port extruded tube.

According to the invention a sealing 33 is provided (see FIG. 14, FIG. 15). The sealing 33 is made up of a basic body 34, that has a rectangular cross-section, and a lip 35 that extends away from the basic body 34. The sealing 33 is arranged inside the socket 21. The lip 35 of the sealing 33 contacts the outer circumferential surface 26 of the cap 24, when the cap 24 is in the forward position (see FIG. 4, 10, 18). The sealing 33 is in a compressed state, when the cap 24 is in the forward position (see FIG. 4, 10, 18). The sealing 33 is in a compressed state, because the lip 35 has been displaced by the cap 24 radially outward (compare FIG. 3 to FIG. 4 and compare FIGS. 9 to 10, compare FIGS. 16 to 18). The tip of the lip 35 and hence a part of the sealing 33 expands into a space that was occupied by a part of the cap 24 when the cap 24 was in the forward position (see FIG. 4, 10, 18) and is given free when the cap 24 slides from the forward position (see FIG. 4, 10, 18) into the backward position (see FIG. 5, 11, 19). The tip of the lip 33 still does not return to its normal state shown in FIG. 3, because the tip of the lip 33 rests against the outer circumferential surface 6 of the multiport extruded tube 1 (see FIG. 15). The restoring force that wants to push the lip 33 back into its normal state (see FIG. 3, 9, 17) and that is still present in the state shown in FIG. 5, because the lip 33 has not been able to return to its normal state (see FIG. 3, 9, 17) but rests against the outer circumferential surface 6 of the multiport extruded tube 1 provides a sealing force that presses the lip 33 against the outer circumferential surface 6 of the multi-port extruded tube 1. The view of FIG. 15 is provided simply to show, how the lip 35 of the sealing 33 is still displaced, when it rests against the outer circumferential surface 6 of the multiport extruded tube 1. As can be seen from FIGS. 14 and 15 the specific shape of the sealing 33 is much better suited to accommodate the specific shape of a multi-port extruded tube than would be the case with an O-ring.

As can be seen from the succession of FIG. 2, 3, 4, 5, and the succession of FIG. 7, 8, 9, 10, 11 because the cap has an interior space 25 that takes up a part of the end section 5 of the multi-port extruded tube 1, namely the part of the end section 5 that is closest to the end 4 of the multiport extruded tube 1, the cap 24 diffuses any rough and/or sharp edges that the end 4 the multiport extruded tube 1 might have. These rough and/or sharp edges are simply taken up by the cap 24. It is the cap 24 that comes into contact with the sealing 33 and not the possibly rough and/or sharp end 4 of the multiport extruded tube 1. The cap 24 hence guides the end 4 of the multiport extruded tube 1 past the sealing 33 without the possibly rough and/or sharp end 4 of the multiport extruded tube 1 being able to come into contact with the sealing 33 and without the possibly rough and/or sharp end 4 of the multiport extruded tube 1 being able to damage the sealing 33.

Figure 2:
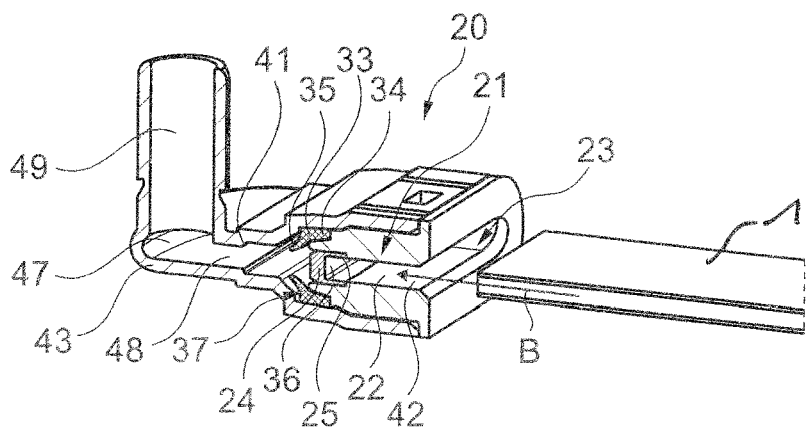
FIG. 2: shows a first assembly of a connector according to the invention and a multi-port extruded tube in a cut schematic perspective view with the connector being in its delivery state and the multi-port extruded tube not having been inserted into the connector yet.
Figure 3:
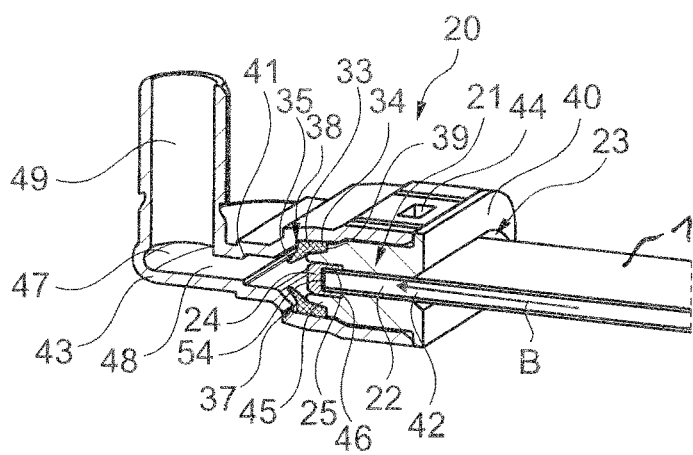
FIG. 3: shows the assembly according to FIG. 2 in a cut schematic perspective view with the multi-port extruded tube having been partially inserted into the connector until a part of the end section of the multi-port extruded tube has been inserted into the interior space of the cap, whereby the cap is in its initial position.

As can best be seen from FIGS. 2 and 6, the cap 24 has one longitudinal fluid opening 36. The longitudinal fluid opening 36 is interrupted by bars 32. These bars 32 add stability to the cap 24 and prevent the partial surface 27 being pushed against the partial surface 28. The barriers 32 can also be arranged to resemble the sidewalls of the channels 2 of the multi-port extruded tube 1 (see FIG. 1); but it also feasible that less bars 32 are present than the multiport extruded tube 1 has sidewalls of channels 2.

Figure 16:
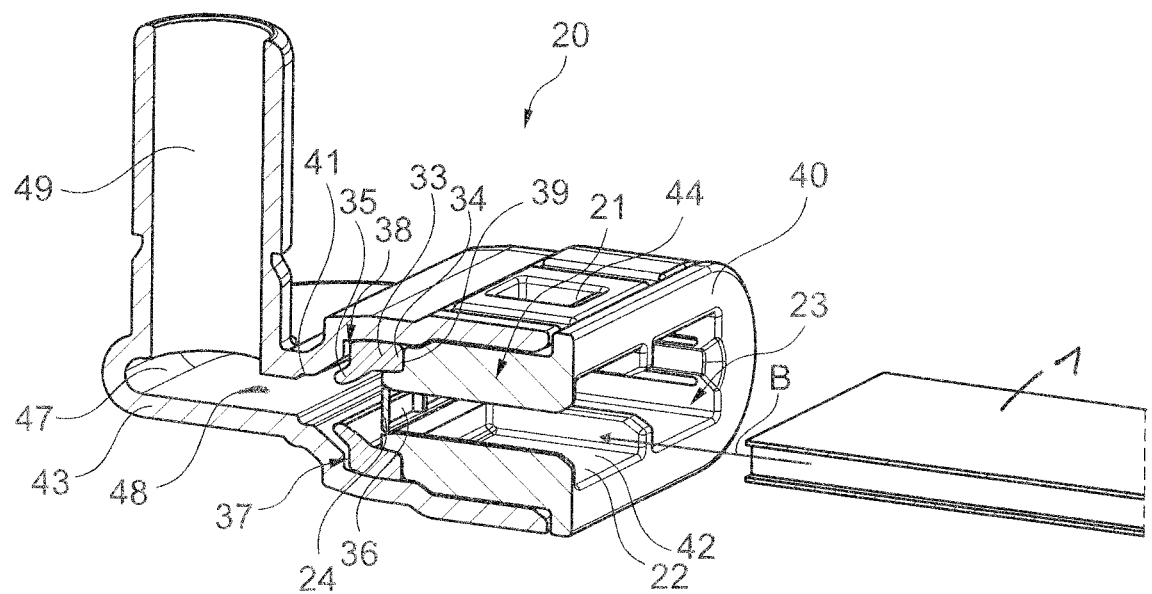
FIG. 16: shows a third assembly of a connector according to the invention and a multi-port extruded tube in a cut schematic perspective view with the connector being in its delivery state and the multi-port extruded tube not having been inserted into the connector yet.
Figure 17:
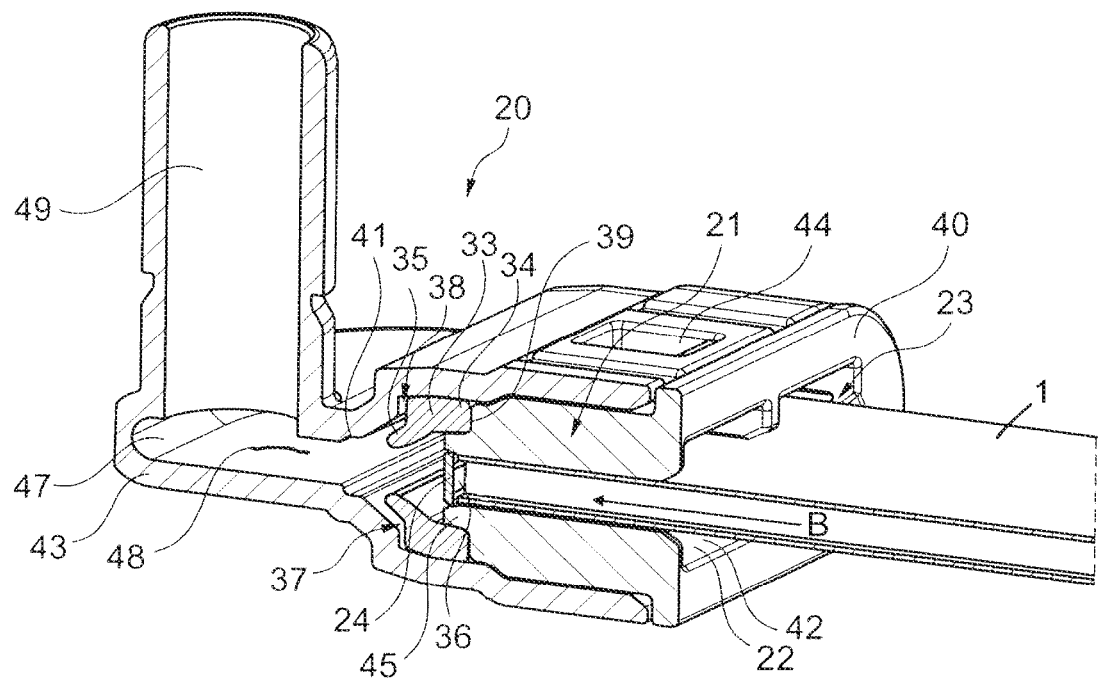
FIG. 17: shows the assembly according to FIG. 16 in a cut schematic perspective view with the multi-port extruded tube having been partially inserted into the connector until a end surface of the multi-port extruded tube rests against a rear surface of the cap, whereby the cap is in its initial position.
Figure 18:
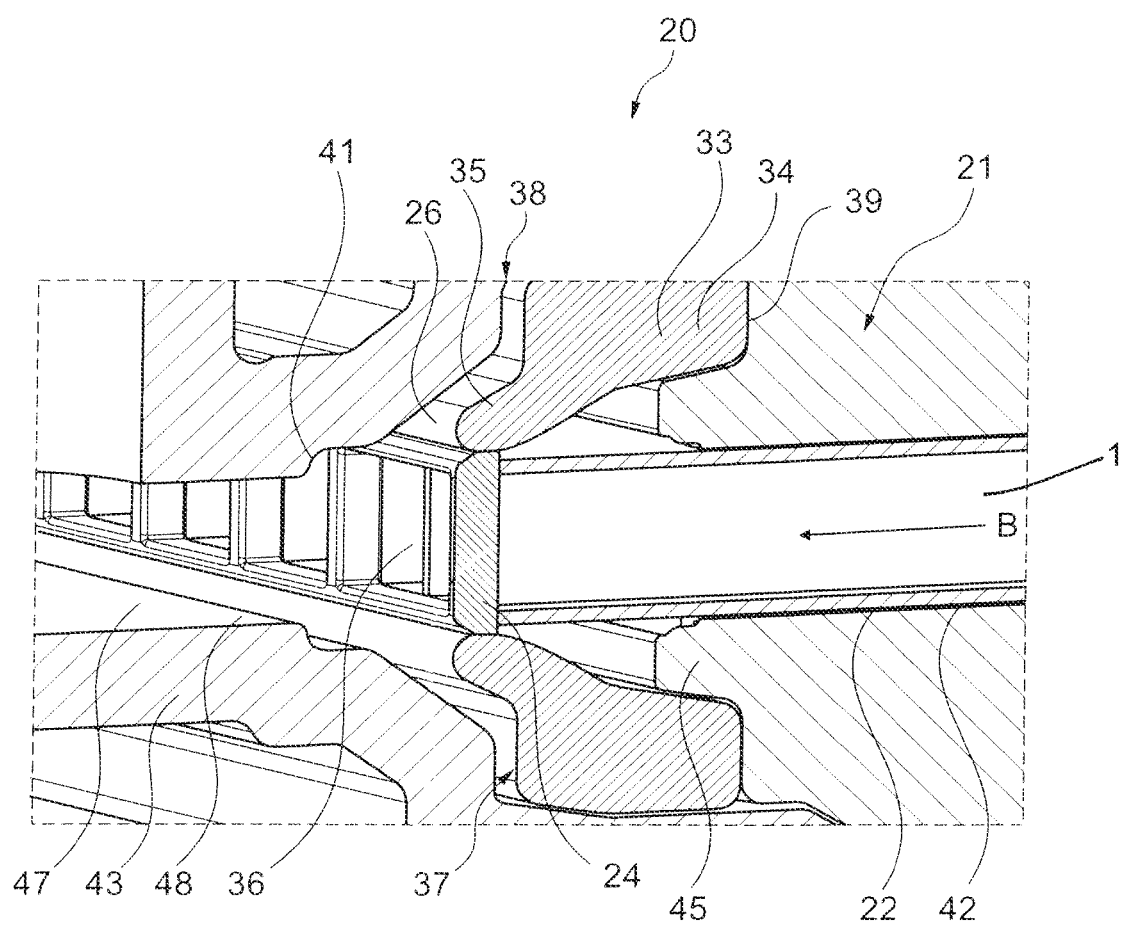
FIG. 18: shows a part of the assembly according to FIGS. 16 and 17 in a cut schematic perspective view with the multi-port extruded tube having been further inserted into the connector than in the position shown in FIG. 17, whereby the cap has reached the forward position.
Figure 19:
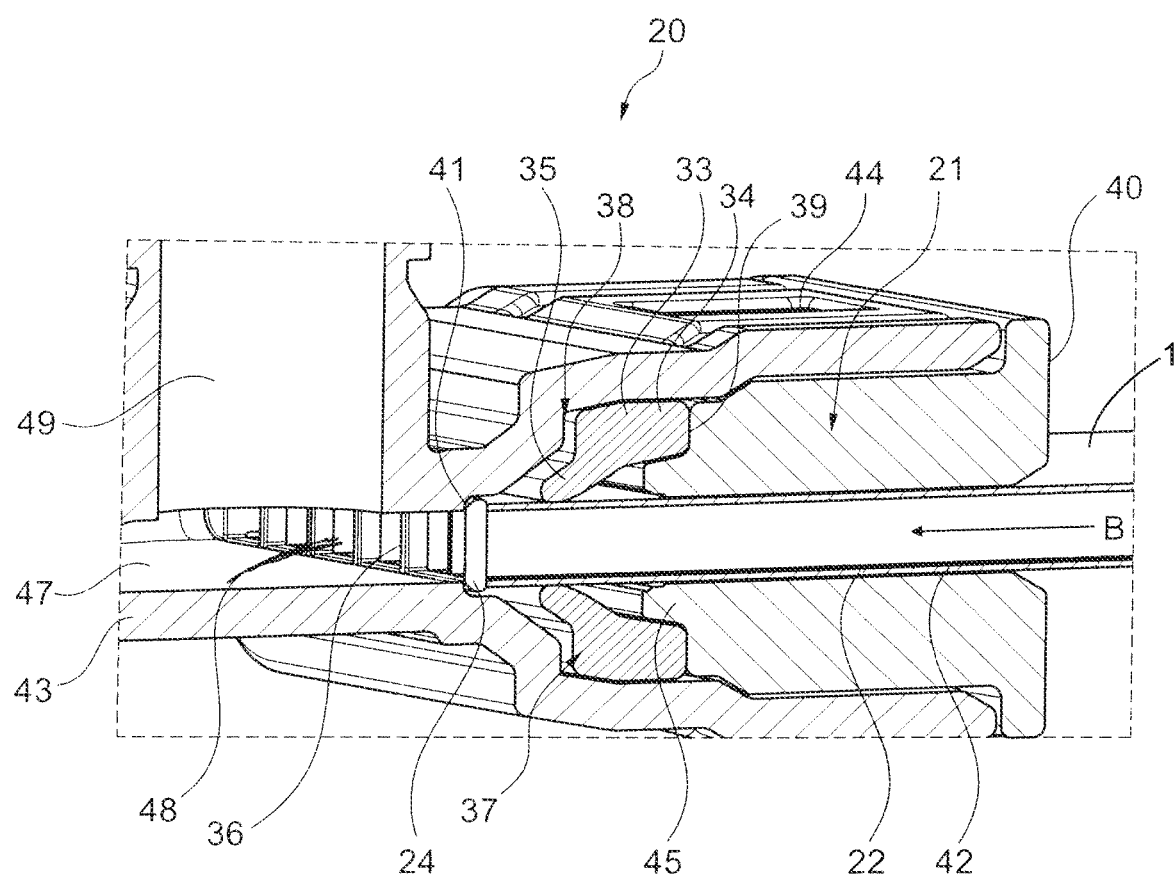
FIG. 19: shows the assembly according to FIGS. 16, 17 and 18 in a cut perspective schematic view with the multi-port extruded tube having been fully inserted into the connector and the cap being in the backward position.

FIGS. 16 to 19 show an embodiment of the assembly, where the cap 24 is designed like a plate and designed for a rear surface of the cap 24 to rest against an end surface of the multi-port extruded tube 1. FIG. 16 shows a similar assembly stage to FIG. 2; FIG. 17 shows a similar assembly stage to FIG. 3; FIG. 18 shows a similar assembly stage to FIG. 4; FIG. 19 shows a similar assembly stage to FIG. 5. For the detailed description reference is hence made to the detailed description of FIGS. 2 to 5. The difference between the embodiment of FIGS. 2 to 5 to the one shown in FIGS. 16 to 19 simply is in the design of the cap 24. In the design of FIGS. 2 to 5, the cap 24 is designed to have the interior space 25 that takes up a part of the end section 5 of the multi-port extruded tube 1, namely the part of the end section 5 that is closest to the end 4 of the multiport extruded tube 1. In the design of FIGS. 16 to 19, the cap 24 has not interior space that is provided to take up a part of the end section 5 of the multi-port extruded tube 1, namely the part of the end section 5 that is closest to the end 4 of the multiport extruded tube 1. In the design of FIGS. 16 to 19, the cap 24 simply rests with its rear surface against an end surface of the multi-port extruded tube 1. It is to be expected that already this placement of the plate-like cap 24 against the possibly sharp or rough end surface substantially reduces damage to the sealing 33.

Figure 11:
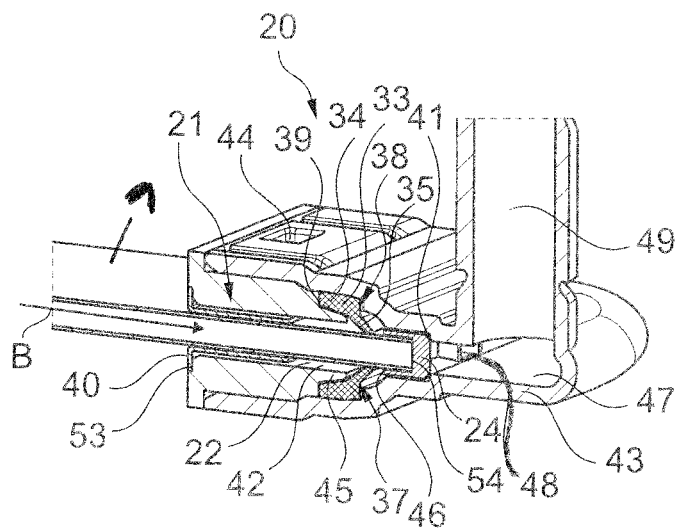
FIG. 11: shows the assembly according to FIGS. 7, 8, 9 and 10 in a cut perspective schematic view with the multi-port extruded tube having been fully inserted into the connector and the cap being in the backward position.
Figure 12:
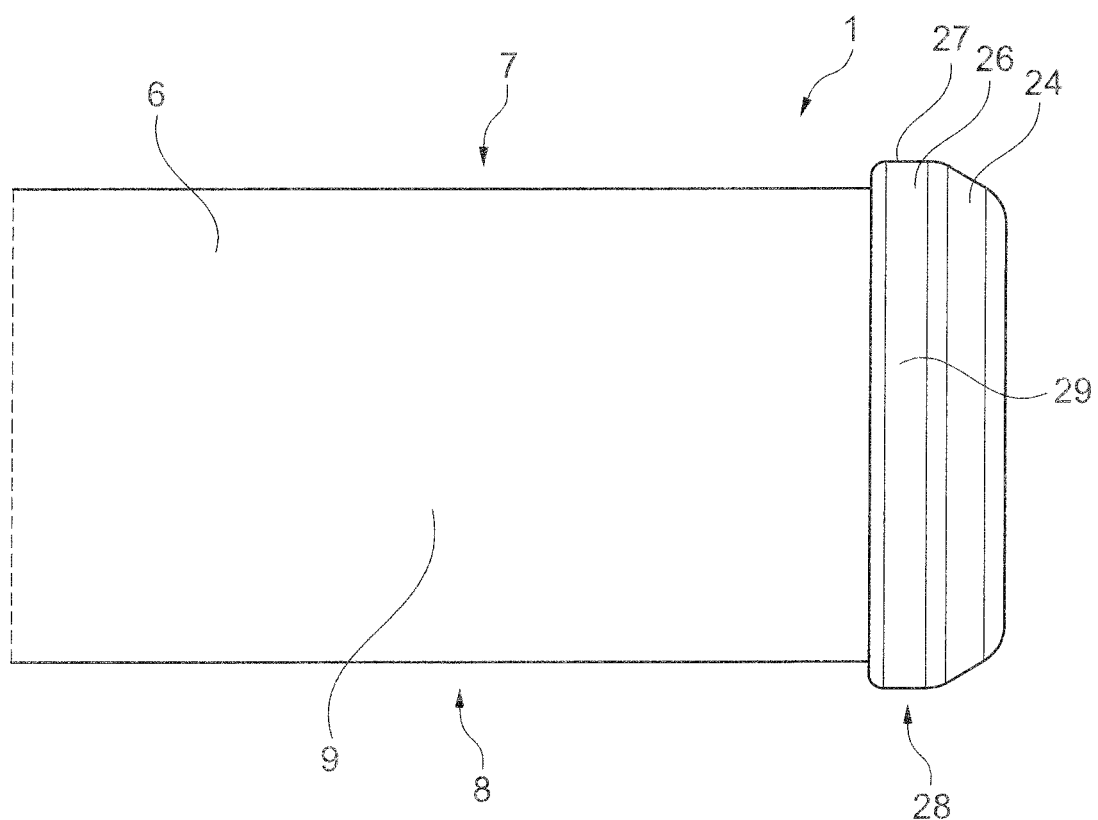
FIG. 12: shows a schematic side view of a further embodiment of a multi-port extruded tube with a cap designed as a plate set onto the end of the multi-port extruded tube.

A fluid that flows along the channels 2 of the multiport extruded tube 1 flows out of the ports 3 and into the fluid opening 36 of the cap 24. Depending on the design of the outer circumferential surface 6 and the walls that delimit the interior space 25 of the cap 24 and depending on the pressure of the fluid, a part of the fluid might pass inbetween the outer circumferential area 6 of the multiport extruded tube 1 and the surfaces that delimit the interior space 25 of the cap 24 and tries to flow backwards towards the opening 23. As shown in FIGS. 5 and 11 the arrangement of the sealing 33 however prevents any such fluid from reaching the opening 23.

Figure 4:
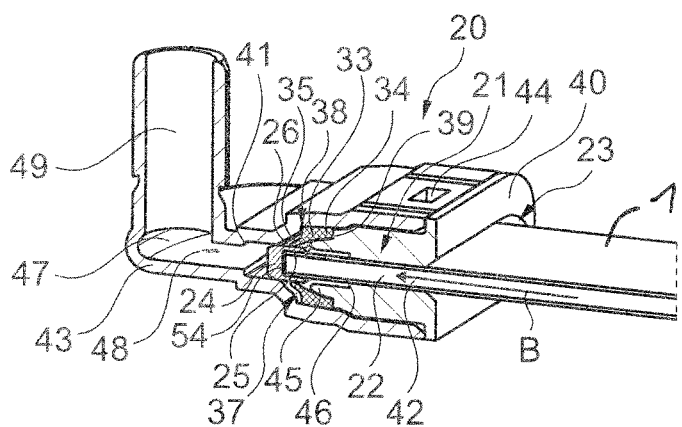
FIG. 4: shows the assembly according to FIGS. 2 and 3 in a cut schematic perspective view with the multi-port extruded tube having been further inserted into the connector than in the position shown in FIG. 2, whereby the cap has reached the forward position.

The socket 21 has a recess 37. The recess 37 is made up by a step 38 in the socket 21 and an end surface 39 of a guiding sleeve 40 that is arranged inside the socket 21. A part of the sealing 33, namely the basic body 34 of the sealing 33 is arranged inside the recess 37. In the design shown in the Fig., this is the case for all positions of the cap 24. However designs are feasible, for example where an O-ring is used as sealing 33, where the sealing 33 would be more inside the recess 37, when the cap 24 is in the forward position, than in positions, where the cap 24 is not in the forward position. In such designs, the sealing 33 would expand into the space that has been given free when the cap 24 slides from the forward position into the backward position. In the design shown in the Fig. it is however only the lip 35 that is displaced by the cap 24, when the cap 24 is in the forward position (FIG. 4, 10). It is the lip 35 that then expands into the space that was previously occupied by a part of the cap 24.

The socket 21 has a cap abutment surface 41. The cap 24 abuts against the cap abutment surface 24 in the backward position (see FIG. 5, 11).

A guiding sleeve 40 is arranged at least in part in the socket 21. The guiding sleeve 40 has guide surfaces 42 that partially delimit the end section receiving space 22. The guide sleeve 40 is made as a separate element to a connector housing 43. The sleeve 40 has a clip (not shown) that engages into a recess 44 in the connector housing 43. The engagement of the clip of the guide sleeve 40 in the recess 44 of the connector housing 43 fixedly attaches the guide sleeve 40 to the connector housing 43 and keeps the guide sleeve 40 in a predefined position inside the socket 21. The guide sleeve 40 has an end wall 39 that is used to partially delimit the recess 37. Additionally, the end of the guide sleeve 40 has an inner wall 45. The inner wall 45 can be used to create a pocket inside the recess 37. The pocket can be used to take up the basic part 34 of the sealing 33. The guide sleeve 40 being a separate element from the connector housing 43 makes the assembly of the connector 20 more easy. When assembling the connector 20 the sealing 33 can be arranged on the inner wall 45 and the cap can be arranged inside the guide sleeve 40, abutting against a cap abutment surface 47 of the guide sleeve 40. Thus preassembled three parts (guide sleeve 40, sealing 33, cap 24) can be jointly inserted into the socket 21 of the connector housing 43. The guide sleeve 40 is pushed into the socket 21 until the clip (not shown) enters into the recess 44.

The connector housing 43 has channel 47. An end opening 48 of the socket 21 leads from the end section receiving space 22 (approximately from the cap abutment surface 41) to the channel 43. A channel opening 49 is provided as part of the housing 43.

The multi-port extruded tube 1 shown in FIG. 6 is provided with a sleeve 31. This sleeve 31 takes up a further guiding function. As can be seen from FIG. 7, the guide surfaces 42 of the guiding sleeve 40 in the design shown in FIGS. 7 to 11 are small end surfaces 50 of support walls 51. The sleeve 31 is designed such that its outer circumferential surface 56 comes into contact with the end surfaces 50 and is supported and guided by the end surfaces 50. By this guidance, the sleeve 31 can also guide the insertion of the multi-port extruded tube 1 into the socket 21 of the connector 20.

The sleeve 31 has an abutment wall 52. The abutment wall engages against the forward pointing surfaces 53 of the support walls 51 (see FIG. 9, 10, 11). The sleeve 31 remains in this position (FIG. 9, 10, 11) and the multi-port extruded tube 1 moves relative to the sleeve 31 (compare FIG. 6,7,8, 9 to FIGS. 10 and 11). The sleeve 31 hence can stabilize the multi-port extruded tube 1 in the regain of the first opening 23.

The interior space 25 of the cap 24 has an end section abutment surface 54. The end section 5 of the multi-port extruded tube 1 abuts against the end section abutment surface 54.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of +0-25, +0-10, +0-5, or +0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A connector suitable to be connected to a multi-port extruded tube, the connector comprising a socket suitable for an end section of the multi-port extruded tube to be inserted into the socket along a linear insertion direction, whereby:

the socket contains an end section receiving space suitable to receive the end section of the multi-port extruded tube, the end section receiving space bordering a first opening suitable for the multi-port extruded tube to extend through it, when the connector further comprises:

a cap arranged inside the socket such that the cap can slide from a forward position that is closer to the first opening to a backward position that is further away from the first opening, the cap having an outer circumferential surface whereby a sealing is provided inside the socket that contacts the outer circumferential surface of the cap in the forward position of the cap, the sealing being in a compressed state when the cap is in the forward position, and whereby at least a part of the sealing expands into a space that was occupied by a part of the cap when the cap was in the forward position and which space is freed when the cap slides from the forward position into the backward position.

2. The connector according to claim 1, wherein the cap has an interior space suitable to receive a part of the end section of the multi-port extruded tube that is inserted into the end section receiving space.

3. The connector according to claim 1, wherein the cap is a plate.

4. The connector according to claim 1, wherein the cap has at least one fluid opening through which a fluid can pass.

5. The connector according to claim 1, wherein the sealing is not an O-Ring.

6. The connector according to claim 1, wherein the socket has a recess and in that at least a part of the sealing is arranged inside the recess when the cap is in the forward position.

7. The connector according to claim 1, wherein the socket has a cap abutment surface and wherein the cap abuts against the cap abutment surface in the backward position.

8. The connector according to claim 1, further comprising a guiding sleeve arranged at least in part in the socket, the guiding sleeve having guide surfaces that partially delimit the end section receiving space.

9. An assembly of a connector according to claim 1 and the multi-port extruded tube, whereby an end section of the multi-port extruded tube is arranged in the socket.

10. The assembly according to claim 9, wherein the interior space of the cap has an end section abutment surface and wherein the end section of the multi-port extruded tube abuts against the end section abutment surface.

11. The assembly according to claim 9, wherein the multi-port extruded tube has an outer circumferential surface and wherein the sealing seals against this circumferential surface when the cap is in the backward position.

12. The assembly according to claim 9, further comprising a guiding sleeve that sits on the multi-port extruded tube and is at least partially arranged inside the socket.

13. The assembly according to claim 9, wherein the multi-port extruded tube has a cross-section in a plane perpendicular to the insertion direction in which the extend of the multi-port extruded tube in this cross-section in one direction is larger than in a direction perpendicular to the one direction.

14. A method for producing the assembly according to claim 9, comprising:
providing the connector with the cap arranged inside the socket and arranged in the forward position;
providing the multi-port extruded tube;
inserting an end section of the multi-port extruded tube into the socket such that the interior space of the cap receives a part of the end section of the multi-port extruded tube; and
further inserting the end section of the multi-port extruded tube into the socket, whereby the multi-port extruded tube pushes the cap from the forward position towards the backward position.

15. A method for producing the assembly according to claim 9, comprising:
providing the connector with the cap not having been inserted in the socket, but the sealing being arranged in the socket,
providing the multi-port extruded tube,
inserting a part of the end section of the multi-port extruded tube into the interior space of the cap,
inserting the end section of the multi-port extruded tube and the cap sitting on the part of the end section that has been introduced into the interior space of the cap into the socket, and
further inserting the end section of the multi-port extruded tube and the cap sitting on the part of the end section that has been introduced into the interior space of the cap into the socket such that the cap passes through the forward position and is moved from the forward position towards the backward position.

\* \* \* \* \*